Oct. 28, 1958 B. C. HOLBEN 2,858,450
SHUTTER SYSTEM
Filed Dec. 20, 1956 6 Sheets-Sheet 1

INVENTOR
BERNARD C. HOLBEN
By Anthony D. Cennamo

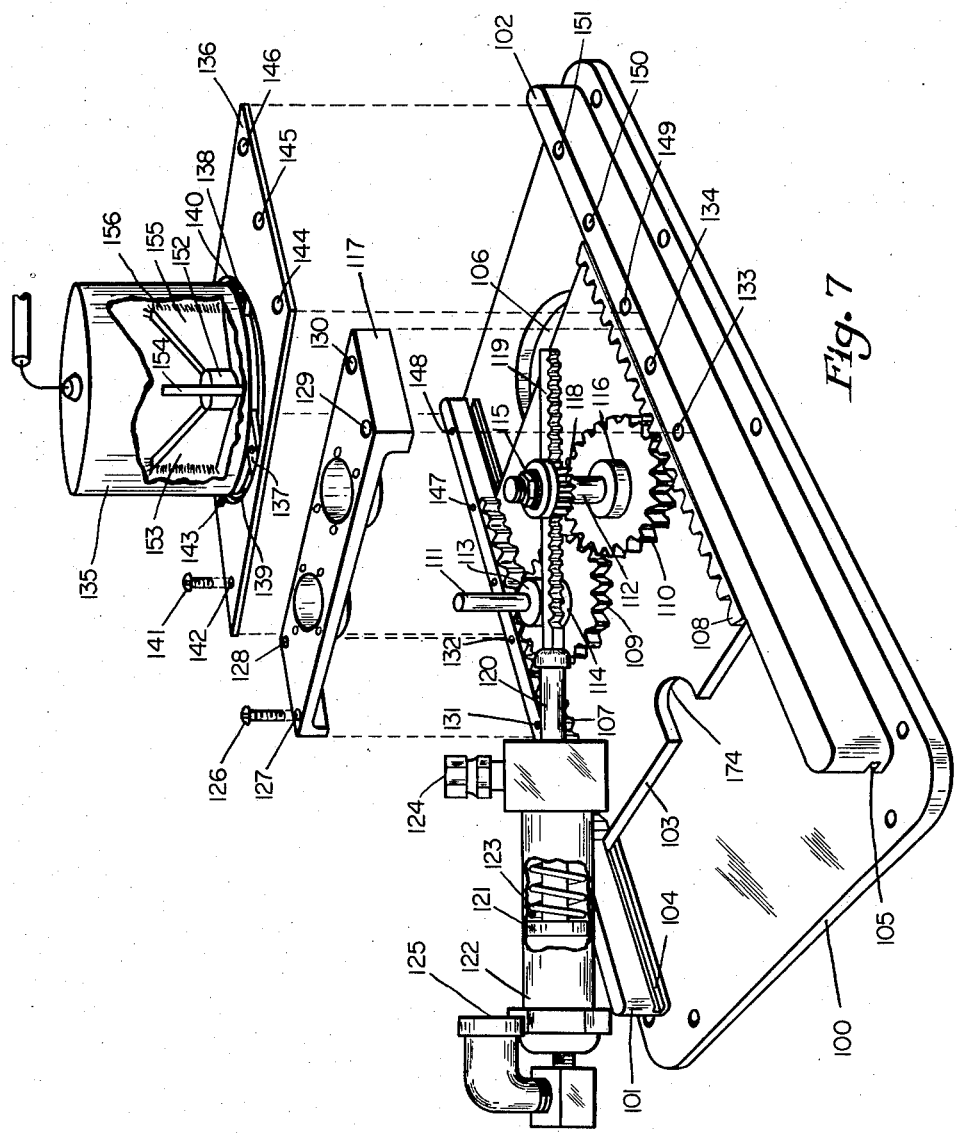

Oct. 28, 1958     B. C. HOLBEN     2,858,450
SHUTTER SYSTEM

Filed Dec. 20, 1956     6 Sheets-Sheet 3

INVENTOR
BERNARD C. HOLBEN
By Anthony D. Cennamo

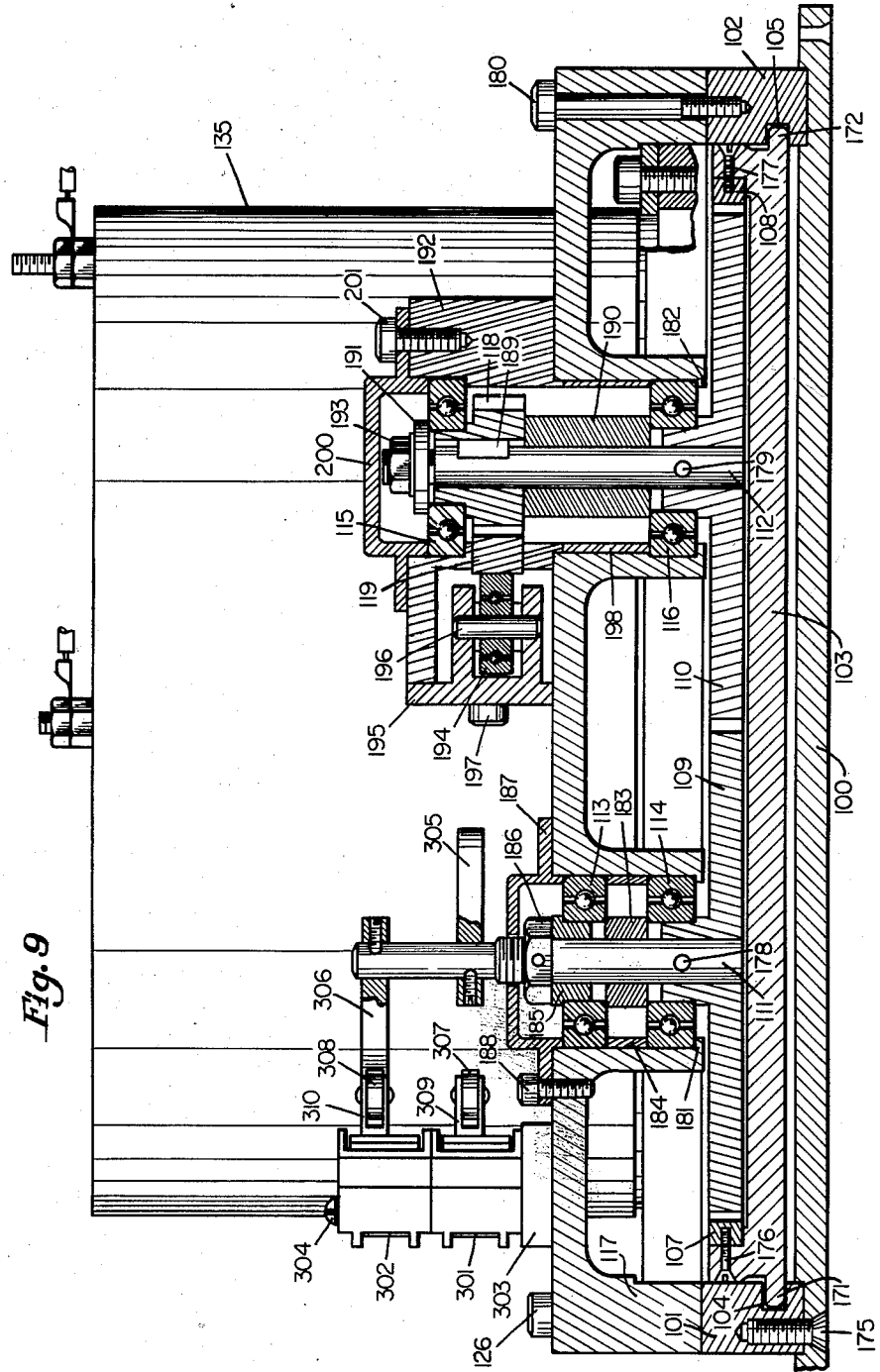

Oct. 28, 1958   B. C. HOLBEN   2,858,450
SHUTTER SYSTEM
Filed Dec. 20, 1956   6 Sheets-Sheet 5
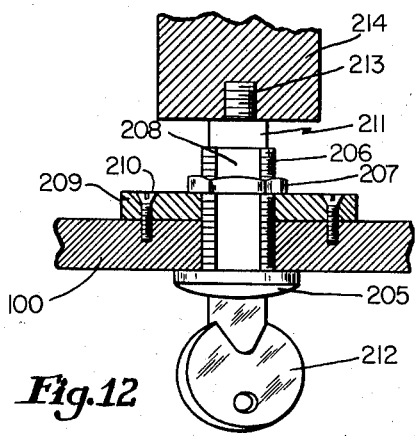
Fig. 12
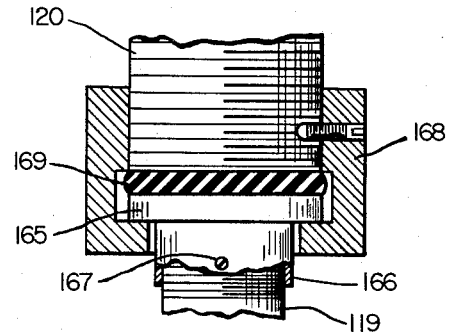
Fig. 10
Fig. 11
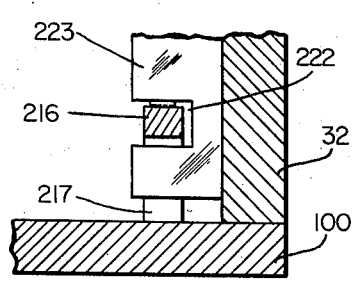
Fig. 14
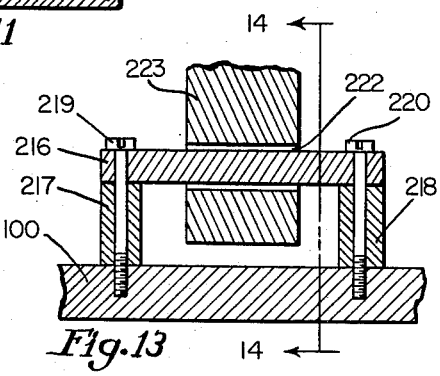
Fig. 13
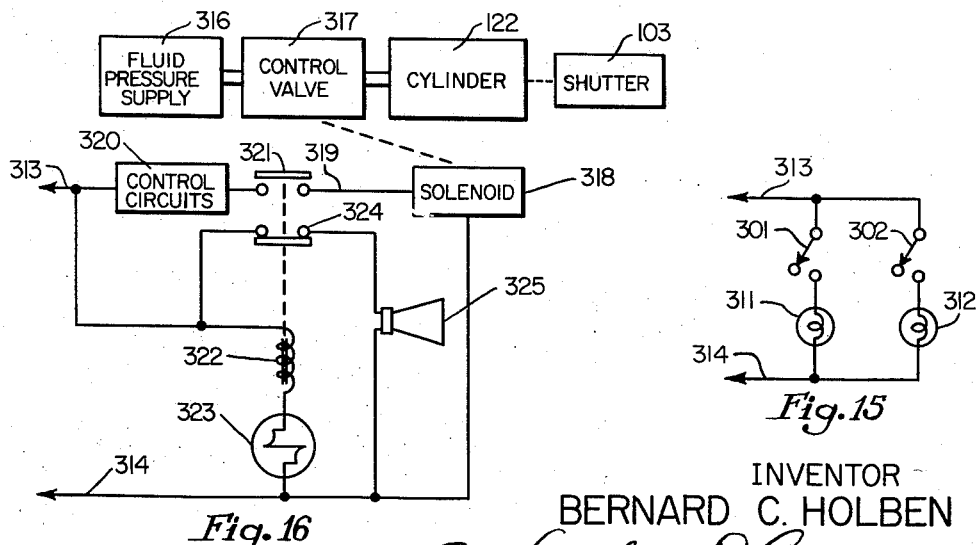
Fig. 16
Fig. 15
INVENTOR
BERNARD C. HOLBEN
By Anthony D. Cenperro Oct. 28, 1958 B. C. HOLBEN 2,858,450
SHUTTER SYSTEM
Filed Dec. 20, 1956 6 Sheets—Sheet 6
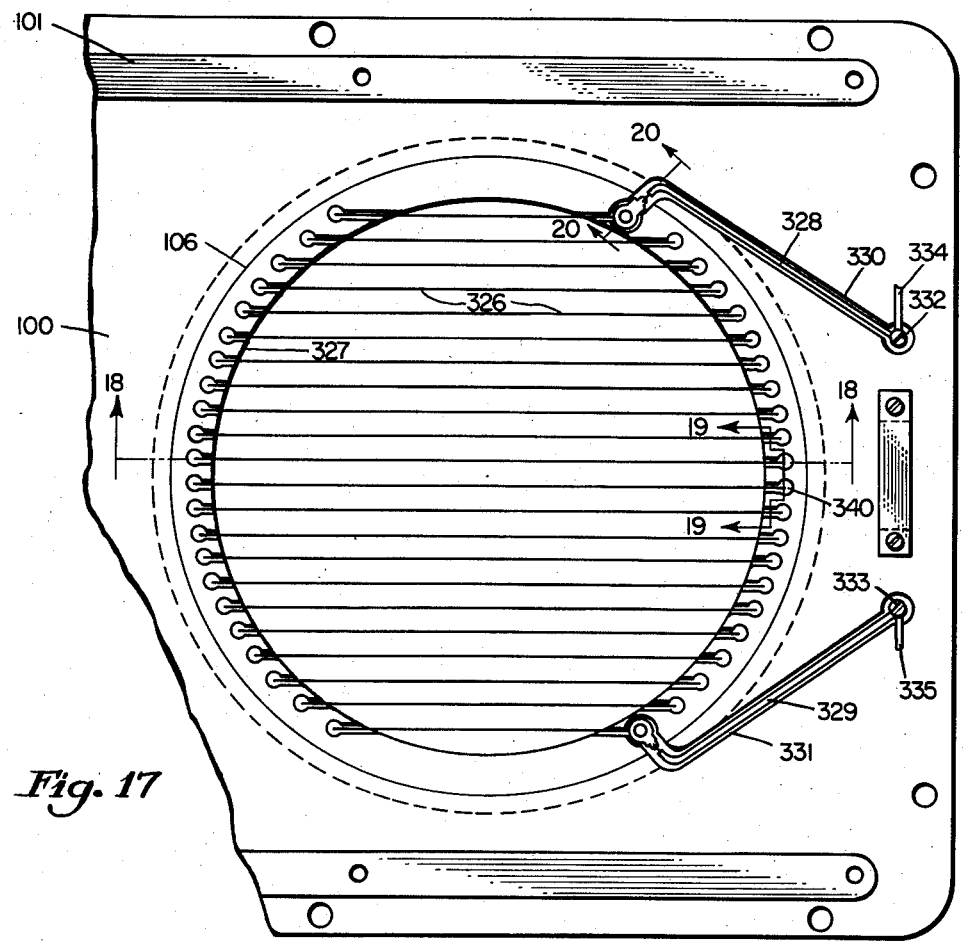
Fig. 17
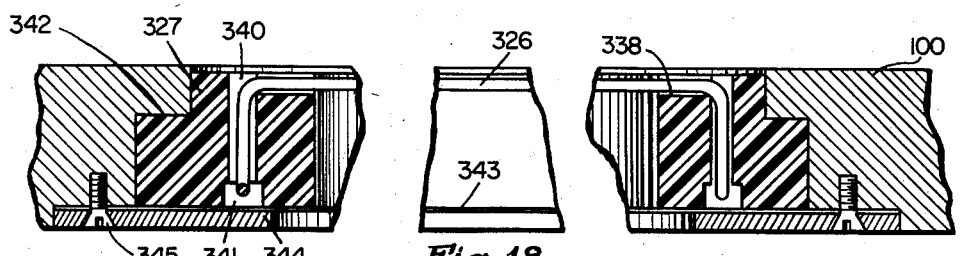
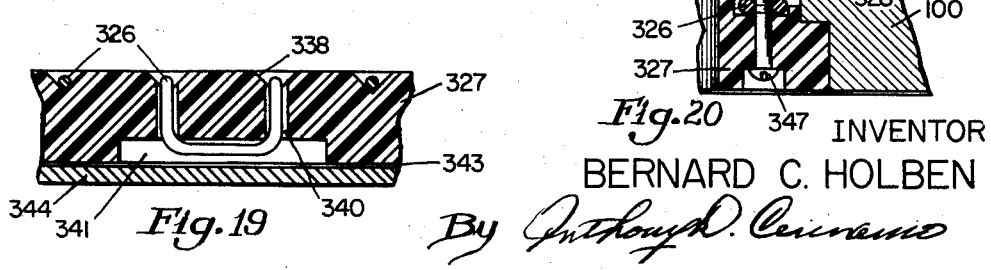
Fig. 18
Fig. 19
Fig. 20
INVENTOR
BERNARD C. HOLBEN
By Anthony D. Cennamo United States Patent Office 2,858,450
Patented Oct. 28, 1958

2,858,450
SHUTTER SYSTEM

Bernard C. Holben, Dublin, Ohio, assignor to Industrial Nucleonics Corporation

Application December 20, 1956, Serial No. 629,690

7 Claims. (Cl. 250—105)

This invention relates to a protective apparatus for use in conjunction with a source of high energy penetrative radiation, and more particularly relates to a new and improved shutter system for use in a nuclear radiation gauge for measuring the physical properties of materials.

Recent years have seen an exponential growth in the use of nuclear sources of penetrative radiation. The utilization of radiations emitted by radioactive substances has ceased to be confined solely to the laboratories, but has been extended into wide areas of industry, not only for research purposes but also in the routine processing and manufacture of a variety of materials and consumer goods.

In the knowledge that overexposure to penetrative radiations can do irreparable damage to the human organism, such common and widespread usage of a potentially dangerous tool cannot be permitted without the guarantee of adequate safeguards to protect the health and safety of the public. Particularly, where radiation devices are to be operated and serviced by personnel with little or no knowledge of basic health physics, radiation safety must be a prime consideration in the design of the radiation source and the instrument or device which is to contain it.

It is obvious that the radiation from a radioactive source cannot be turned on and off in the manner of a light bulb or an X-ray tube, for the nuclear disintegration processes are inexorable and continue ceaselessly to produce their radiation emission at all times, whether or not a health hazard to personnel in the vicinity may be attendant thereon, or whether or not any useful purpose is served thereby.

The three basic expedients which can be employed to prevent personnel overexposure to the radiations from an external source involve distance, time and shielding. Staying at a distance from the radiation source takes advantage of the inverse square law and air absorption. Limiting the working time in the radiation field is a means of limiting the dose absorbed by the tissues of the body. Shielding refers to the interposition of a barrier of radiation absorbing material between the person and the source as a means of attenuating the radiation beam to a tolerance level. This invention involves the concept of shielding as a means of radiological protection.

In many radiation devices, it is customary to surround the source with an adequate thickness of shielding material except for an aperture on one side through which the useful radiation beam may emerge. When the device is not in actual use, it is customary to cover this aperture with an additional absorber member adapted to block the radiation exit so that a wall of shielding surrounds the source in all directions.

To accomplish the last purpose described, in accordance with the teachings of this invention, there is provided an automatic shutter mechanism which, if desired, may be combined with associated control, indicator and safety devices, and which makes possible an on-off switch-type control for a beam of nuclear radiation.

In nuclear gauging there are many instances where it is necessary to employ a radiation beam of high intensity and/or penetrating power. Often this radiation is electromagnetic in character, and, depending on the application, may range from soft X-rays to gamma radiation exceeding a million electron-volts of energy per photon. In the case of a high intensity beta ray source, a considerable amount of X-rays (bremsstrahlung) is generated in the absorption of the beta rays by the shielding, even though the beta radiation itself may easily be absorbed by a relatively thin barrier. On the other hand, present health safety regulations generally require that the radiation level at the surface of the closed aperture shall not exceed the very low value of 7.5 milliroentgens per hour, based on a 40-hour week of maximum permissible exposure. Hence, the radiation shutter must often be of a thick cross-section and heavy; requiring considerable power for its operation. At the same time, there are definite space limitations imposed by the parameters of measurement and the necessity for maintaining scattered radiation at a low level while measuring as will be brought out in the description.

For purposes of apt illustration, this invention will be described in conjunction with a nuclear gauge for measuring the physical properties of materials. Specifically, the invention will be shown as incorporated in a nuclear instrument of the industrial thickness gauge type in which reflected or "backscattered" radiation is utilized for measurement of the material property of interest. The reason for this choice is that reflection gauging imposes certain particular requisites on the mechanical design of a shutter mechanism which are not attendant on all other types of allied devices, and the advantages of the present invention are made more apparent by illustrating the manner in which the invention fulfills these special requisites. However, it is to be clearly understood that the discussion of such a preferred embodiment is meant to be illustrative only, and should in no way be considered restrictive to the scope of the invention as will be duly set forth in the appended claims.

It is the object of this invention to provide an effective and reliable shutter system which will allow an intense radiation beam to be turned on and off from a remote location.

It is another object to provide a power actuated shutter mechanism which may be adapted for automatic operation.

A further object is to provide a shutter actuating mechanism powerful enough to operate a thick and heavy shutter while occupying a minimum of space.

It is a still further object to provide a shutter system with a positive indicating device whereby operating personnel may readily determine whether the source shutter is open or completely closed.

Still another object of this invention is to provide means whereby the shutter may be instantly and automatically closed to protect a radioactive source in the event of threatened damage to the source as a result of an accident or tampering, which might otherwise result in contamination of a working environment or product with a highly dangerous radioactive substance.

It is again an object to provide a shutter mechanism for a device of the radiation thickness gauge type, wherein the distance between the source and the measured material may be reduced to a minimum, so as to obtain adequate detector response with a minimum intensity source, thereby to minimize scattered radiation in the vicinity of the gauge while measuring.

Other objects and advantages of the present invention will become apparent on following its detailed description, taken in conjunction with the accompanying drawings, in which:

Figure 7 is a simplified schematic view of the shutter mechanism in perspective, showing the functional arrangement of its parts in relation to a radiation source and detector.

Figure 9 is a section on the line 9—9 of Figure 8.

Figure 10 is an enlarged sectional view showing the method of coupling the drive rack to the piston rod.

Figure 11 is a partial section on the line 11—11 of Figure 8, showing the installation of the shielding insert in the shutter plate.

Figure 12 is a section on the line 12—12 of Figure 8, showing details of the lock mechanism.

Figure 13 is a partial section on the line 13—13 of Figure 8, showing the method of anchoring the forward end of the shutter base plate when the assembly is locked.

Figure 14 is a section on the line 14—14 of Figure 13.

Figure 15 is a circuit schematic of the shutter position indicator system.

Figure 16 is a schematic diagram of a control system for the shutter actuating mechanism, incorporating a protective grid circuit and automatic alarm device.

Figure 17 is a partial plan view of the shutter base plate, showing the protective grid installed in the radiation aperture.

Figure 18 is an enlarged section on the line 18—18 of Figure 17, showing the construction of the grid.

Figure 19 is an enlarged section on the line 19—19 of Figure 17 showing further details of the grid construction.

Figure 20 is a section on the line 20—20 of Figure 17, showing a method of connecting the lead wires to the grid.

Figure 1:
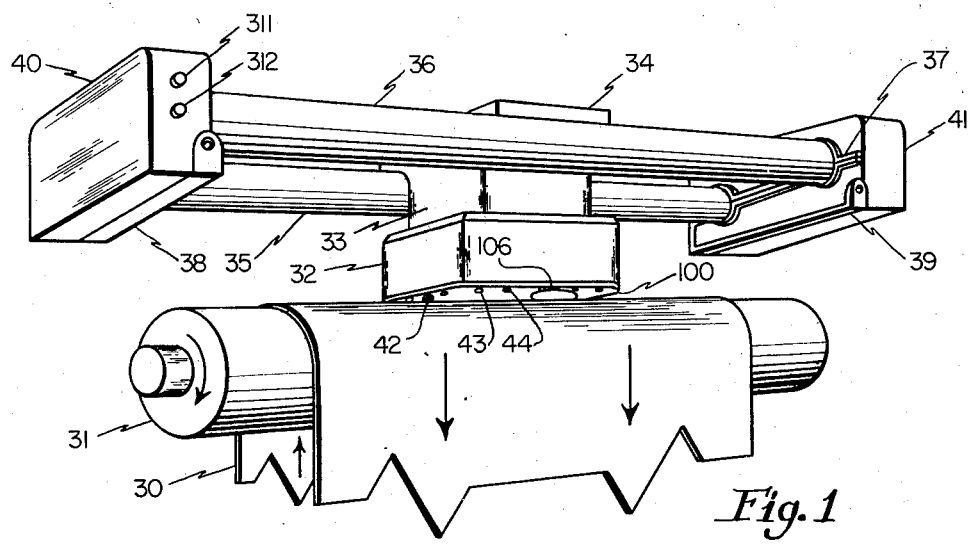
Figure 1 is a perspective sketch illustrating the use of a nuclear reflection gauge as a typical device in which the subject invention may be incorporated.

Referring now to Figure 1, there is illustrated the structure and application of a typical device which may incorporate the subject invention. This drawing shows a sheet of material 30, which may have issued from a continuous processing machine, being inspected for a property such as thickness by a nuclear reflection gauge. At 31 is a roll over which the sheet 30 passes for gauging under the inspection head 32. The head 32 includes an intermediate housing 33, which may contain various components of the electronic circuitry associated with the measurement function, and a carriage assembly 34 whereby the inspection head 32 is supported for lateral traversing movement along the length of the tubular frame and track members 35 and 36. The latter tubes are rigidly clamped between split end-frames as at 37, yoked to the mounting brackets 38 and 39 which in turn may be bolted or otherwise secured to suitable base or overhead support members (not shown) constructed or adapted to bear the weight of the gauging device and maintain its proper spatial relationship to the flow of material passing underneath. The end-housings 40 and 41 may contain suitable motor means and associated mechanism whereby the inspection head 32 can be automatically positioned at various points across the width of the measured sheet 30, or to permit continuous traveling of the inspection head 32 back and forth across the sheet 30 for scanning measurement thereof.

At 106 there is shown an aperture in the bottom cover or base plate 100 of the inspection head 32. Through this aperture radiation from a radioactive source issues in the direction of the sheet 30 as it passes over the roll 31. After interaction with the measured sheet 30 (and in some instances the surface of the roll 31), some radiation is reflected back through the aperture 106 onto a radiation detector within the head 32. The intensity and/or energy of the reflected radiation thereby provides a measure of the material property which is desired to be known, e. g., the thickness of the total sheet 30 or the thickness of a coating or plating which has been applied to the surface thereof.

Figure 2:
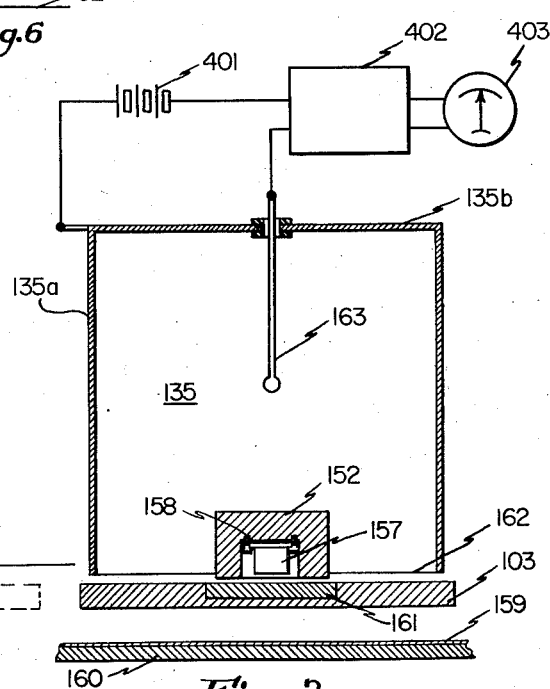
Figure 2 is a schematic diagram illustrating the principles of radiation reflection measurement and showing certain details of the invention associated therewith.

Figure 2 schematically illustrates the basic principles of reflection measurement, to which a preferred embodiment of the present invention pertains, and shows certain details of the invention in cross-section.

At 135 is an ionization chamber type of radiation detector comprising a metallic outer shell indicated by 135$a$ and 135$b$ and an insulated probe 163. A unidirectional voltage which may be furnished by the battery 401 is applied between the shell 135 and the probe 163. Radiation to be measured may enter through the thin window 162 to ionize the gas contained within the chamber. In the well-known manner, this results in a current flow through the chamber which may be amplified and measured by suitable electronic apparatus indicated at 402. A suitable indicating and/or controlling device 403 is actuated by the amplifying and measuring device 402, and may be calibrated to read in units of the measured property such as the thickness of the coating 159 on which the intensity and/or energy of the reflected radiation depends.

Ancillary to some of the more specific objects of this invention, a preferred embodiment thereof makes use of a specially designed ionization chamber with provision for mounting the radiation source holder entirely within the chamber itself. Thus, in Figure 2, the numeral 152 indicates the source holder, in which a source capsule 157 containing radioactive material is mounted, as by suitable screws as at 158. The source holder 152 is constructed of a dense shielding material so that the interior of the chamber receives substantially no direct radiation from the source 157. When the radiation device is not operating the radiation exit is covered by the shutter 103. In some cases the shutter may contain an insert 161 of a particularly efficient shielding material. Although a heavy metal such as lead may be satisfactory, it is found to be advantageous to use a special alloy such as is manufactured by P. R. Mallory and Co., Inc., of Indianapolis, Indiana, and marketed under their trade name of Mallory 1000 Metal. When the shutter 103 is closed, this insert is placed in the direct path of the radiation beam issuing from the opening in the source holder 152. By this method, adequate shielding may be obtained while the thickness, weight, and cost of producing the shutter are reduced to a minimum.

The dotted lines indicate the retracted position, 103$a$, of the shutter in open condition when the radiation device is in operation. When the shutter has been thus withdrawn in the direction of the arrow, the radiation exit in the source holder 152 is uncovered, and the outer surface of the chamber window 162 is completely exposed to re-entrant radiation.

There is also shown a reflecting medium comprising a measured material 159 and a base reflector 160. The measured material 159 may correspond to the sheet 30 in Figure 1 and the reflector 160 may correspond to the roll 31. In other cases the measured material 159 may be a relatively thin coating or plating substance which has been applied to a heavier base sheet of material 160. In other applications the reflecting material may be substantially homogeneous, as would be the case, for example, if it were desired to measure the ratio of two substances in an alloy or other mixture. In the particular set-up shown in Figure 2, a portion of the radiation issuing from the source penetrates the measured material 159 and is reflected from the base material 160 back through the measured material 159 into the ionization chamber 135 through the chamber window 162. The electrical response of the chamber to this reflected radiation may provide a primary measure of the thickness of the material 159.

A very important advantage of the preferred mechanism of the present invention is that it allows for a minimum distance between the source and chamber windows and the reflecting surface. It can be shown experimentally that as this distance is increased beyond a point of maximum radiation into the chamber, the detector response decreases at a very rapid exponential rate.

Figure 4:
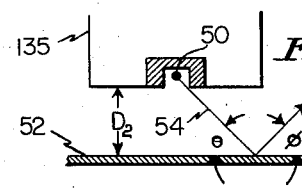
Figure 4 is a sketch showing the assumed ray of Figure 3 being reflected into a region outside the detector as a result of increased distance to the reflecting surface.
Figure 3:
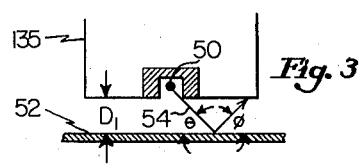
Figure 3 is a sketch illustrating an assumed ray from a radioactive source being reflected into a detector.

One reason for this decreased response is illustrated by Figures 3 and 4. As is shown in Figure 3, if a reflector 52 is located at a distance $D_1$ from the chamber, a ray 54 from the source 50 which strikes the reflector 52 at an angle $\theta$ and is reflected at an angle $\theta$ will enter the chamber and be measured. However, if the distance to the reflector is increased to $D_2$ as shown in Figure 4, same ray 54 striking the reflector 52 at the same angle $\theta$ and reflected at the same angle $\theta$ will not enter the chamber, thereby contributing nothing to the magnitude of the measurable response.

Figure 5:
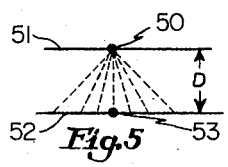
Figure 5 shows a surface irradiated by a point source in the plane of a detector.

As another way of illustrating the phenomenon of rapidly decreasing response with increasing distance, consider the point source 50 in Figure 5 which is irradiating the surface 52. The intensity of radiation falling on the surface 52 depends on the well known inverse-square law, which states that radiation intensity varies in proportion to $1/D^2$ where D is the distance from the source. Thus if the distance D, for example, is increased from ½ inch to 1 inch the radiation received by the surface 52 is decreased to one-fourth its original intensity.

Figure 6:
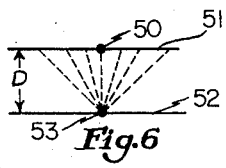
Figure 6 is a sketch illustrating how reflected radiation from a point in the reflecting surface may be returned to the detector.

Since in this case we are concerned primarily with radiation reflected into the detector, Figure 6 illustrates how one might also consider a point 53 in the reflecting surface 52 from which radiation is returned in the direction of the plane 51 of the detector, and infer that the inverse square law is also operative on the reflected radiation; thereby concluding that, since the intensity of reflected radiation from point 53 depends on the intensity of radiation received from the source 50, the response of the detector is inversely proportional to $1/D^4$. Such an assumption would indicate that if the distance D is increased from ½ inch to 1 inch, the response of the detector would be reduced to $1/16$ of its original value.

Those well versed in the art are of course aware that no such simple relationship exists in the apparatus shown in Figure 2. As a matter of fact, there are such a multiplicity of variables involved that no general mathematical relationship can be derived, since the parameters of measurement are subject to change with any variation in the construction of the apparatus, the source, or the measured material. For example, the much oversimplified illustration given here neglects the fact that as a rule of thumb a source cannot be considered a point source to which the inverse square law is strictly applicable unless the distance involved is at least 20 times the largest dimension of the source, which condition cannot be met in this case. However, this explanation is sufficiently accurate for the present purpose, which is to impart some appreciation of the rapidity with which the detector response may be expected to decrease with increasing distance from the reflector.

With this point in mind, it is easily realized that in general the closer it is possible to locate the source and detector to the measured material, the smaller the amount of radioactive material which must be used to obtain an adequate level of response from the detector. It is also apparent that, by reducing the intensity of the source to a minimum, the scattered radiation in the vicinity of an operating gauge is reduced to a minimum, with an attendant reduction in the radiation exposure to personnel in the vicinity when the source shutter is open.

It is also highly desirable that this result be achieved with a mechanism which permits the inspection head 32 to be constructed with minimum dimensions of length and width, since the gauge must be adapted for installation on existing production lines where space is at a premium and where suitable mounting locations are often quite restricted as to available space. These requirements are fulfilled in the preferred embodiment of this invention by the location of the radioactive source inside the chamber and by the use of the mechanical arrangement shown in Figure 7.

Referring again to Figure 1, the base plate 100 on the bottom of the inspection head 32 may be unlocked by inserting a proper key into the lock 42. This lock is provided so that only authorized personnel may be permitted to gain access to the interior of the housing containing the radioactive source. After unlocking the base plate 100, this member may be lowered from the housing upon removing the plurality of countersunk screws represented by 43 and 44.

Figure 7 shows the essential details of the shutter mechanism. In this schematic view, the mechanism has been disassembled, with only essential parts reassembled to clearly show the manner of their functioning. Attached to the base plate 100, which is also shown in Figure 1, are the shutter guide bars 101 and 102. The shutter 103 is provided with a pair of integral, laterally projecting tongues, not clearly visible in this figure, but detailed in Figure 9, which extend the length of the shutter 103 and which are adapted for sliding engagement with the milled grooves or ways, 104 and 105, in the guide bars 101 and 102. This arrangement allows for longitudinal sliding movement of the shutter 103 so as to cover or uncover the radiation aperture 106, which comprises a circular opening in the base plate 100.

Attached to the shutter 103 are the gear racks 107 and 108 which are adapted to be driven by gears 109 and 110 respectively. Gears 109 and 110 are rigidly mounted on upwardly extending shafts 111 and 112, respectively provided with suitable bearing pairs 113, 114, and 115, 116. These gears, shafts and bearing assemblies are supported entirely by the bearing support member 117 which is shown detached in exploded view fashion. To simplify the explanation of the essential mechanism, the associated bearing caps, spacers, and other appurtenances have been omitted from Figure 7, but are shown detailed in Figures 8 and 9.

Keyed on the shaft 112 is a gear 118 to which a driving torque may be imparted by the drive rack 119, which is connected to a piston rod 120. The shutter actuating mechanism is powered by a fluid operated piston and cylinder driving device comprising a piston 121 adapted for reciprocating movement in the cylinder 122 and guided by the piston rod 120.

In one preferred embodiment of the invention, the drive cylinder assembly may include a powerful coiled spring 123 adapted to be seated against the rod end of the cylinder and to exert a rearward pressure against the piston 121. In this case the forward end of the cylinder may be vented through connection 124 and a suitable dust filter (not shown).

To open the source shutter, compressed air is admitted to the rear of the cylinder through connection 125, forcing the piston 121 forward and compressing the spring 123. This forward motion of the piston produces linear movement of the piston rod 120 and rack gear 119, the latter imposing a clockwise rotary motion on drive gear 118 and shaft 112 as well as gear 110 which is in mesh with the gear rack 108 attached to one side of the shutter 103. At the same time, gear 109 is given a counterclockwise rotation by virtue of its being in mesh with its mated gear 110. Gear 109 is in mesh with the gear rack 107 which is attached to the other side of the shutter 103. Since the axes of the shafts 111 and 112 and their associated bearings are held stationary by the support 117, which in the fully assembled mechanism is secured to the shutter guide bars 101 and 102 by means of capscrews, exemplified by 126, which pass through holes 127–130 to engage the threaded openings 131–134, the forward movement of the piston 121 results in a rearward movement of the shutter 103 to open position. The reverse action occurs when air pressure to the rear of the cylinder 122 is released through the line 125, allowing the spring 123 to force the piston 121 to the rear, moving the shutter 103 to its closed position covering the radiation aperture 106.

It is apparent that the air pressure operated actuating means may be replaced by any one of several driving devices; for example, a special electrical solenoid, a motor and rack gear arrangement, or a piston and cylinder adapted to be driven by oil pressure under the control of a suitable valve arrangement.

In the preferred embodiment of the invention, the radiation detector comprises an ionization chamber 135 supported on a mounting plate 136 and fastened thereto by a plurality of retaining lugs, exemplified by 137 and 138, which extend into an annular milled groove 139 in the outer periphery of the wall of the chamber 135, and which are in turn secured to the mounting plate 136 by means of a plurality of bolts exemplified by 140. Inasmuch as the outer shell of the chamber 135 is connected to a source of electrical potential and is charged with a voltage approximately equal to the potential of the voltage source 401 in Figure 2, the mounting plate 136 is constructed of an electrically insulating material such as a phenolic plastic marketed under the name of Synthane, Grade CE, or equivalent. In the fully assembled mechanism, the mounting plate 136 (shown detached) is secured to the shutter guide bars 101 and 102 by a plurality of cap screws, exemplified by 141, which pass through holes as 142–146 into the threaded openings as 147–151.

The cutaway section of the chamber wall makes visible the source holder 152 together with its associated plurality of support fins exemplified by 153, 154 and 155 which may be silver-soldered to the inner wall of the chamber as at 156.

Figure 8:
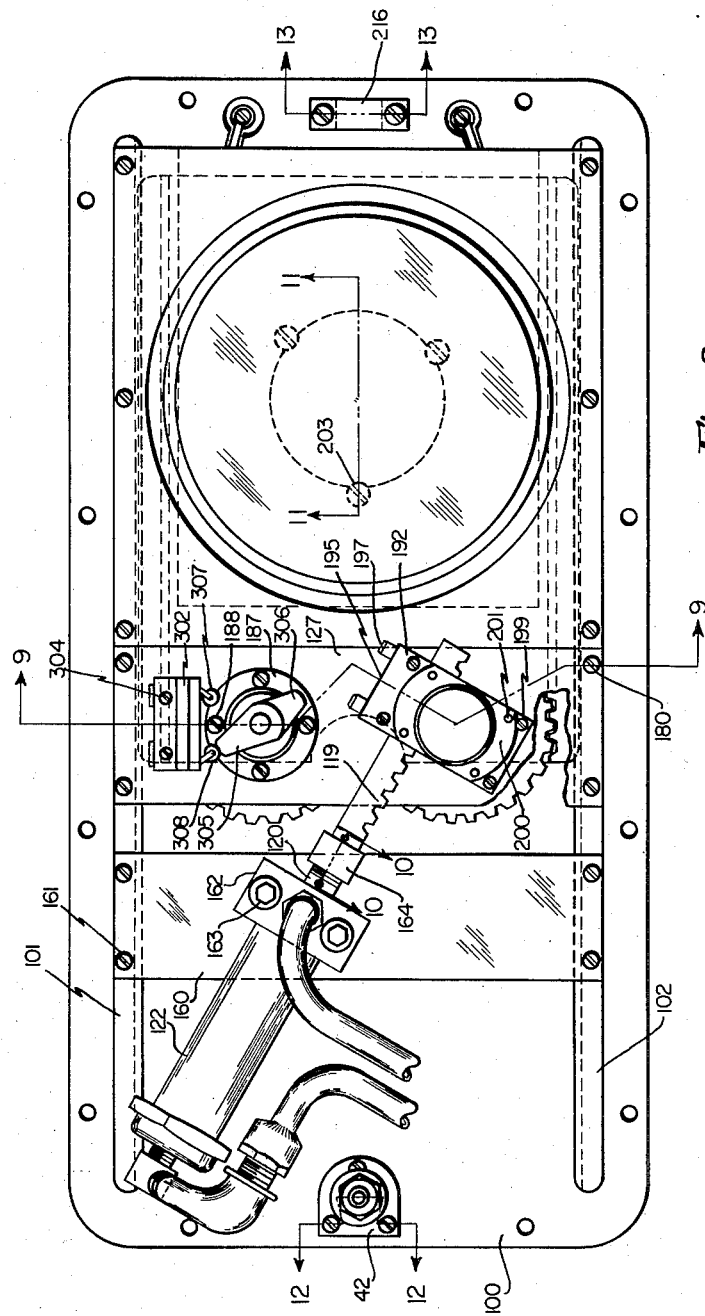
Figure 8 is a detailed plan view of the mechanical shutter mechanism.

Figure 8 is a more detailed plan view of the apparatus shown in Figure 7 with the shutter in fully closed position, pointing out certain features omitted in that schematic figure. Proceeding from left to right, the numeral 42 indicates the lock mechanism shown in Figure 1. The drive cylinder 122 is mounted on a flat metal plate 160 which straddles the shutter guide bars 101 and 102 and is secured thereon by bolts as at 161. The mounting block 162, which may be an integral part of the cylinder assembly, is in turn fastened to the plate 160 by means of bolts as at 163, so as to secure the cylinder to the assembly at its forward end.

The coupling device 164 whereby the drive rack 119 is attached to the piston rod is shown in Figure 10. It includes a pad member having a circular flange 165 and equipped with a hub 166 which is screwed on the end of the drive rack 119 and secured by means of a suitable roll pin 167. The hub 166 projects through a loose-fitting port hole in the end of the cap 168 which is screwed onto the piston rod 120 so that the flange 165 and the resilient cushion disc 169 are clamped between the cap 168 and the end of the piston rod 120. This arrangement avoids any need for extreme accuracy in the alignment of the piston with the drive mechanism. The cap 168 may be secured in position by means of a set screw as indicated.

Figure 9 is a section on the jogging line 9—9 of Figure 8. The shutter 103 is supported, so as to clear the base plate 100, by the tongues 171 and 172 which ride in milled grooves 104 and 105 in the guide bars 101, and 102. The guide bars 101 and 102 are attached to the base plate 100 by suitable screws, as at 175. The rack gears 107 and 108 are seated on raised, milled stepped portions at the sides of the shutter 103 and are secured thereto by screws as at 176 and 177 which pass through countersunk holes drilled horizontally in the integral, upwardly extending side portions of the shutter 103. The rack gears 107 and 108 are thus in alignment with the gears 109 and 110, which are suspended in outboard fashion on shafts 111 and 112 by their overhanging bearing assemblies so that gears 109 and 110 may clear the main upper surface of the shutter 103.

The gears 109 and 110 are press-fitted on the lower ends of the shafts 111 and 112 and further secured thereto by roll pins 178 and 179, which are installed prior to the machining of the gear hubs to accommodate the rotating inner races of ball bearings 114 and 116. Said bearings are carried in bored openings in the cast bearing support 117, which is bolted to the shutter guide bars 101 and 102 by means of suitable cap screws as at 180. The bored openings in the casting 117 terminate at their lower ends with an annular reduced diameter stepped portion 181 and 182 against which the stationary outer races of ball bearings 114 and 116 are seated at their outer periphery.

The bored opening in the casting 117 which accommodates bearing 114 is also adapted to receive bearing 113 which sits on inner and outer spacers 183 and 184 on top of bearing 114. The rotating inner race of ball bearing 113 is clamped between the inner spacer 183 and a flanged bushing 185 by means of a large nut 186 screwed onto a threaded portion of the shaft 111 and secured in position by any suitable means such as a set screw as indicated. The circular bearing cap 187 which retains the assembly is machined to include an annular portion adapted to protrude into the bored opening in the casting 117, so as to clamp the stationary members of ball bearings 113 and 114 and their associated spacer 184 in place. The bearing cap 187 has a flanged portion which rests on top of the casting 117, whereto it is secured by a plurality of cap screws as at 188. If necessary, one or more suitable shims may be employed between the cap flange and the casting to insure a proper fitting of the parts.

The shaft 112 which carries the gear 110 has its upper end milled for a suitable key 189 to match the slot in the drive gear 118. The gear 118 is assembled on the shaft 112 on top of a spacer 190 which is placed between the gear and the rotating inner race of ball bearing 116. The gear 118 has an upwardly extending hub which is machined to accommodate the rotating inner race of ball bearing 115. The machining is performed so as to leave an annular step portion of greater diameter on the hub, whereon the inner rotating bearing race may be seated, so as to allow this member to protrude slightly beyond the upper face of the gear hub. This allows the heavy flat washer 191 to abut the bearing race so that when the nut 193 is screwed onto the threaded, reduced diameter end portion of the shaft 112, the bearing race, gear 118, spacer 190 and the rotating inner race of bearing 116 are clamped between the washer 191 and the gear 110. A suitable lock washer may be placed under the nut 193 as indicated.

As previously explained, the linear motion of the drive piston 121 imparts a rotary motion to the drive gear 118 through the agency of the gear rack 119. The gear rack 119 is constructed with finished surfaces at top and bottom which bear against a finished slot in the bearing block 192 which is adapted to hold the gear rack 119 in vertical alignment with the drive gear 118 while permitting sliding movement of said gear rack. Suitable bearing surfaces may be provided by constructing the bearing block 192 of brass and providing chrome plated surfaces on the gear rack 119. Proper meshing of the teeth of gear rack 119 with the drive gear 118 is maintained by a ball bearing 194 which is adapted to bear the radial thrust tending to separate the rack from the gear.

Bearing 194 is supported in a yoke member 195 on a pin 196 which is press-fitted into the stationary inner race of the bearing 194 as well as the upper and lower arms of the yoke 195. Suitable top and bottom spacer washers are used to center the bearing between the arms of the yoke 195 so as to permit free rotation of the outer bearing race which bears against the gear rack 119. The bearing block 192 is of slotted construction to receive the yoke 195 which is secured thereto by cap screws as at 197.

The bearing block 192 is machined to include an annular portion adapted to protrude into the bored opening in the casting 127 so as to clamp the outer race of bearing 116 and its associated spacer 198 in place when the bearing block is seated upon the upper surface of the support 117, to which it is secured by cap screws, as at 199 in Figure 8. The outer race of the upper bearing 115 is assembled into a bored opening in the top of the bearing block 192, and seated on a reduced diameter stepped portion therein. It is secured by a bearing cap 200 held in place by cap screws as at 201 after the fashion of the cap 187 which retains the bearing 113 as previously described.

Figure 11 is a partial section of the shutter 103 taken on the line 11—11 of Figure 8. The shielding insert 161 is press-fitted into a cylindrical recess in the shutter plate so as to sit flush with the top surface thereof, and is retained therein by a plurality of screws as at 203 whose heads are recessed into counterbored openings in the shutter plate and radially overlapping portions of the insert 161 so that the screw heads may secure the latter in place.

Figure 12 is a partial section on the line 12—12 of Figure 8 showing details of the lock mechanism 42 indicated in Figure 1. The lock extends through a hole in the base plate with the keyhole flange 205 toward the bottom exterior side. The flange 205 is integral with the cylindrical tumbler housing 206 which is threaded to receive the mounting nut 207. The threaded housing 206 has a flat face 208 on one side. The anchor plate 209, which is secured to the base plate 100 by screws as at 210, has a central opening which is cut partially on the radius of a circle and partly on a chord thereof. This chord engages the flat face 208 on the threaded housing 206 to prevent the same from being turned in the opening. The stud portion 211 is rotatable by means of a proper key 212, and carries a threaded member 213, which may engage matching threads in a suitable member 214 provided in the housing 32 of Figure 1. The member 214, which is superimposed on Figure 12, may be a reinforcing rib integral with the casting which forms the housing 32 in Figure 1. Referring to Figure 7, it will be noted that a notch 174 is provided in the rear of the shutter 103 to permit this member to clear the lock 42 when the shutter is in retracted position.

To prevent the other end of the base plate 100 (see Figure 1) from being lowered without first unlocking the base plate by means of the lock 42, there is provided a device shown in Figures 8, 13, and 14. Figure 13 is a partial section on the line 13—13 of Figure 8; and Figure 14 is a partial section on the line 14—14 of Figure 13. A rectangular loop formed by the bar 216 and legs 217 and 218 is secured to the base plate 100 by means of bolts 219 and 220. This loop can be accommodated by a notch 222 cut into one of the reinforcing ribs 223 which is integral with the casting of the housing 32, shown superimposed on Figure 14 to depict the assembly with the base plate 100 in position against the housing. The notched rib member thus forms a "hook" over which the bar 216 may be placed before the base plate is bolted and locked in position, and prevents this end of the base plate from being lowered when the lock 42 is engaged.

Referring to Figures 8 and 9, there are shown a pair of switches 301 and 302, mounted on top of the spacer 303 and secured to the bearing support 117 by means of screws as at 304. The switches are selectively actuated by corresponding cams 305 and 306, through roller followers 307 and 308 mounted on the pivoted arms 309 and 310. The cams 305 and 306 are mounted on an upwardly extending reduced diameter portion of the shaft 111, and secured thereto by set screws as indicated. The switch mechanism is used in conjunction with the signal lights 311 and 312 shown in Figure 1, as is indicated in the circuit schematic of Figure 15. The lamp circuits are supplied with power from a voltage source indicated by lines 313 and 314. When the shutter is completely open, the source open lamp 311 receives power through switch 301, and similarly when the shutter is completely closed the source closed lamp 312 receives power through switch 302. The use of duplicate switches and lamps makes the system much less subject to the possibility of a false signal interpretation by operating personnel in the event of electrical or mechanical failure, since one lamp or the other will normally be lighted at all times when there is power on the equipment, and trouble is immediately suspected if both lamps are burning or extinguished at the same time. It is generally desirable that the source open light 311, which is in effect a warning signal, be colored red and mounted above a green source closed lamp 312 in the customary manner of traffic signal lights, for the benefit of operating personnel who may or may not be color-blind.

Figure 16 is a schematic diagram showing an example of a system whereby the operation of the shutter may be automatically controlled in accordance with some of the principal objects of the invention. A prominent feature is the source safety and alarm mechanism.

The shutter 103 is actuated by the drive cylinder 122, which may receive power from a suitable fluid pressure supply indicated at 316 and be controlled directly by the valve mechanism 317. The control valve mechanism 317 is in turn actuated by an electrical solenoid 318, so that when the solenoid is energized by electrical power on lines 314 and 319, the control valve 317 admits fluid pressure from the supply 316 to the cylinder 122, thereby opening the shutter 103. Conversely, when electric power is removed from lines 314 and 319 and the solenoid 318 is de-energized, the shutter 103 is driven to its closed position in a manner which has been previously explained.

Under normal conditions, suitable control circuits, as indicated at 320, determine the open or closed position of the shutter. For example, suitable push buttons and conventional holding relay circuits may be installed on the gauge operator's control panel, so as to provide direct remote control of the shutter position. An alternate method would be to combine the shutter control with the on-off circuits of the gauge measuring system, so that the shutter is open while measurement is in progress but closed where the gauge is in standby condition or off-sheet. In any case, the solenoid 318 cannot receive power except through contacts 321 of the alarm relay 322.

The alarm relay 322 receives power from the source indicated by lines 313 and 314, and is connected in series with the grid 323. The grid 323 is installed below the shutter 103 in the radiation exit aperture 106 shown in Figure 1, and is designed to allow the relay circuit to be broken in the event that a foreign object should be projected into the radiation aperture as a result of accident or tampering. De-energizing the relay 322 causes its contacts 321 to open, de-energizing the control solenoid 318 and in turn causing the shutter to be closed immediately and automatically. This provides considerable protection for the radioactive source, since in many cases the shutter is able to close in time to prevent further entry of the object into the radiation aperture. De-energizing the alarm relay 322 also causes power to be applied to an alarm signalling device 325 through contacts 324, to notify attendants of an accident involving possible danger to the radiation source.

Figure 17 is a partial plan view of the base plate 100 showing the radiation aperture 106 containing the grid 323. The grid comprises a continuous length of wire 326 laced back and forth upon an annular support of insulating material 327. The ends of the wire grid are connected to the external circuits through insulated lead wires 328 and 329 which rest in shallow grooves 330 and 331 milled in the base plate 100. The grooves 330 and 331 allow extra clearance between the shutter 103 and the lead wires 328 and 329. Lead wires 328 and 329 are anchored upon suitable insulating posts 332 and 333 located outside the range of movement of the shutter 103. From here the wires 334 and 335 may lead to the external circuit.

Figure 18 is an enlarged section on the line 18—18 of Figure 17, and Figure 19 is a partial section on the jogging line 19—19 of the same. The wire 326 rests in parallel shallow grooves as at 338 cut in the inner top portion of a phenolic ring 327. It also is threaded vertically through holes as at 340 bored in the phenolic ring 327 and runs horizontally along the annular milled groove 341 cut into the underside of the ring 327 as is best shown in Figure 19. The wire may be sealed into the grooves 338 and 341 with a suitable compound such as Glyptal.

The phenolic ring 327 is inserted into the bottom of the opening 106 in the base plate 100, and its outer peripheral flange 342 is seated on a matching stepped portion milled in the base plate 100. The opening 106 providing the radiation aperture is sealed against dirt and moisture by a thin membrane 343 stretched in drum head fashion over the retaining ring 344 which is inserted into an annular groove in the base plate 100 and secured by screws as at 345. It has been found appropriate to construct the membrane 343 of a thin, strong, flexible, plastic sheet material such as is manufactured and marketed by E. I. du Pont de Nemours and Company under the trade name of Mylar polyester film. Such a plastic material, being of organic composition, has a low effective atomic number, and therefore reflects a minimum quantity of radiation into the detector. The membrane 343 is bonded to the retaining ring 344 with a suitable adhesive to form an assembly which is readily replaceable. The retaining ring 344 has the further function of holding the phenolic ring 327 in place.

It should be noted that the wire grid 323 is particularly suitable for use in a reflection type gauging device, since it provides the necessary structural strength while reflecting a minimum of spurious radiation into the detector, and without greatly attenuating the useful radiation beam. In other devices a printed circuit could be applied to the surface of a window constructed of a sheet material such as mica.

Figure 20, which is a section on the line 20—20 of Figure 17 shows a suitable method of connecting the lead wires 328 and 329 to the grid 323. The insulated wire 328 is soldered to a threaded terminal 346 which sits in a counterbored recess in the phenolic ring 327. A screw 347 clamps the threaded terminal 346 in place on top of a loop formed in the wire 326. This arrangement permits the grid assembly to be replaced without removing the base plate 100 from the head 32.

Although only certain specific and preferred embodiments of the present invention have been shown herein, it is to be expressly understood that many modifications thereof are possible without departing from the scope and true spirit of this invention.

What is claimed is:

1. In a radiation device, a radioactive source of penetrative radiation; shielding surrounding said source; an opening in said shielding defining a radiation exit; a shutter, said shutter comprising an essentially rectangular plate including at least one portion substantially opaque to said radiation; bearing means for supporting said shutter for rectilinear movement between a position blocking said radiation exit and a position removed from said exit; a gear rack rigidly secured to said shutter, a circular gear in mesh with the teeth on said gear rack; actuating means for driving said circular gear; means for controlling the operation of said actuating means, and means for indicating each of the two positions of said shutter.

2. A radiation device, comprising aperture means for defining a beam of penetrative radiation; shutter means for opening and closing said aperture; bearing means for supporting said shutter for rectilinear movement relative to said aperture; a linear gear rack rigidly attached to said shutter; a circular gear engaging mating teeth on said gear rack; power actuating means for driving said circular gear to operate said shutter; means for controlling the operation of said actuating means, and electrical means for providing a remote indication of the open and closed positions of said shutter.

3. In a radiation device, a radioactive source of penetrative radiation; shielding surrounding said source; an opening in said shielding defining a radiation exit; a shutter, said shutter including at least one portion substantially opaque to said radiation; bearing means for supporting said shutter for rectilinear movement between a position blocking said radiation exit and a position removed from said exit; a gear rack rigidly secured to said shutter, a circular gear in mesh with teeth on said gear rack; means including a fluid-operated piston and cylinder driving device for actuating rotation of said circular gear; and means for controlling the operation of said driving device.

4. A radiation device, comprising aperture means for defining a beam of penetrative radiation; shutter means for opening and closing said aperture; a pair of linear gear racks rigidly attached to said shutter; a pair of mutually meshed circular gears respectively engaging mating teeth on said gear racks; means for supporting said circular gears in fixed spatial relation to said aperture, said supporting means including bearing means for permitting rotation of said circular gears; actuator means for driving said circular gears, and means for controlling the operation of said actuator means.

5. In an apparatus for gauging the properties of a material by subjecting said material to the action of a penetrating radiation, a radioactive source emitting said radiation, a housing, means for mounting said source within said housing, an aperture in one side of said housing for permitting a useful beam of radiation from said source to issue forth from said housing, means for positioning a material to be measured in the path of said radiation beam; a shutter, said shutter comprising an essentially rectangular plate including at least one portion substantially opaque to said radiation beam; bearing means for supporting said shutter for movement between a first position blocking said aperture and a second position removed from said aperture, a gear rack rigidly secured to said shutter, a gear train terminating with said gear rack, reversible actuator means mounted within said housing for driving said gear train, a power source for energizing said actuator means, means for controlling the operation of said actuator means including a switch means having a first alternative state whereby said actuator means is energized to drive said shutter to said first position and a second alternative state whereby said actuator means is energized to drive said shutter to said second position, an electrical circuit including a frangible grid, means for mounting said grid in position to cover said aperture in said housing, electrical means for energizing said circuit, means responsive to a major reduction in electrical current through said circuit for placing said switch means in said first state when said grid is damaged and means for indicating each of the two positions of said shutter.

6. In an apparatus for gauging the properties of a material by subjecting said material to the action of a penetrating radiation, a radioactive source emitting said radiation, a housing, means for mounting said source within said housing, an aperture in one side of said housing for permitting a useful beam of radiation from said source to issue forth from said housing, means for positioning a material to be measured in the path of said radiation beam, a shutter, said shutter comprising an essentially rectangular plate including at least one portion substantially opaque to said radiation beam; bearing means for supporting said shutter for movement between a first position blocking said aperture and a second position removed from said aperture, a gear rack rigidly secured to said shutter, a gear train terminating with said gear rack, reversible actuator means including a fluid-operated piston and cylinder driving device mounted within said housing for driving said gear train, a power source for energizing said actuator means, means for controlling the operation of said actuator means including a switch means having a first alternative state whereby said actuator means is energized to drive said shutter to said first position and a second alternative state whereby said actuator means is energized to drive said shutter to said second position, an electrical circuit including a frangible grid, means for mounting said grid in position to cover said aperture in said housing, electrical means for energizing said circuit, means responsive to a major reduction in electrical current through said circuit for placing said switch means in said first state when said grid is damaged; and means for indicating each of the two positions of said shutter.

7. Reflection gauging apparatus comprising a radioactive source of penetrative radiation, a radiation detector including means for mounting said source within the volume of space occupied by said detector, shielding means for preventing the entry of direct radiation from said source into an active detecting portion of said detector, an aperture in said shielding means for permitting a useful beam of radiation from said source to issue in a direction away from said detector; a shutter, said shutter including at least one portion substantially opaque to said radiation; bearing means for supporting said shutter for rectilinear movement between a position blocking said aperture and a position removed from said aperture, a linear gear rack rigidly attached to said shutter, a circular gear engaging teeth on said gear rack, power actuating means for driving said circular gear to operate said shutter, mean for controlling the operation of said actuating means, means for positioning a material to be measured in the path of said useful radiation beam, means for permitting radiation reflected from said material to enter said active detecting portion of said detector, and means for registering the output of said detector.

References Cited in the file of this patent

UNITED STATES PATENTS

| Re. 22,531 | Hare | Aug. 22, 1944 |
| 2,094,103 | Horsley et al. | Sept. 28, 1937 |
| 2,536,131 | Herzog et al. | Jan. 2, 1951 |